United States Patent [19]

Strosser et al.

[11] Patent Number: 4,788,813
[45] Date of Patent: Dec. 6, 1988

[54] METAL DETECTION IN THE VICINITY OF FERROUS BOUNDARIES

[75] Inventors: Richard P. Strosser, Akron; Carl E. Bohman, New Holland; Mark K. Chow, Leola, all of Pa.

[73] Assignee: Ford New Holland, Inc., New Holland, Pa.

[21] Appl. No.: 143,471

[22] Filed: Jan. 13, 1988

[51] Int. Cl.$^4$ .......................................... A01D 75/18
[52] U.S. Cl. ..................................... 56/10.2; 340/684
[58] Field of Search ................... 56/10.2, DIG. 15; 340/684

[56] References Cited

U.S. PATENT DOCUMENTS

| | | | |
|---|---|---|---|
| 3,747,501 | 9/1973 | Bennett, Jr. et al. | 56/DIG. 15 |
| 3,896,608 | 7/1975 | Garrott | 56/DIG. 15 |
| 3,959,953 | 6/1976 | Garrott | 56/10.2 |
| 3,972,156 | 8/1976 | Bennett, Jr. | 56/10.2 |
| 4,322,937 | 4/1982 | Hollmann | 56/10.2 |
| 4,344,074 | 8/1982 | Strosser et al. | 56/DIG. 15 |
| 4,353,199 | 10/1982 | Chow et al. | 56/10.2 |
| 4,433,528 | 2/1984 | Bohman | 56/DIG. 15 |

Primary Examiner—Paul J. Hirsch
Attorney, Agent, or Firm—Griffin, Branigan, & Butler

[57] ABSTRACT

In a forage harvester having a metal detector with permanent magnets located within a crop feed roll, additional permanent magnets are positioned beyond the ends of the feed roll and at a distance greater than the radius of the feed roll from the axis of rotation of the feed roll. The additional magnets cooperate with magnets within the feed roll to provide a more uniform flux density across the width of the feed roll, even in regions near ferrous side sheets defining the lateral limits of the harvester feed path. Tramp metal is thus detected with equal facility regardless of its trajectory past the feed roll.

8 Claims, 2 Drawing Sheets

METAL DETECTION IN THE VICINITY OF FERROUS BOUNDARIES

BACKGROUND OF THE INVENTION

This invention relates to an improvement in metal detectors used in forage harvesters, and more particularly to apparatus for producing a more uniform flux density across the feed path of the harvester, even in regions bounded by ferrous parts.

Bohman Pat. No. 4,433,528 discloses a metal detector located in the lower front feed roll of a forage harvester. The metal detector generates a magnetic field between the lower front feed roll and an upper front feed roll so that a ferrous tramp metal object passing between the feed rolls induces a signal in the metal detector. The metal detector then produces an output signal to stop the feed thus preventing damage to the cutter head in the harvester by the metal object.

While the metal detector arrangement disclosed in the Bohman patent is admirably suited to its intended purpose, and is widely used, it suffers a disadvantage when used in a harvester having ferrous side sheets defining the lateral limits of the crop feed path. These ferrous parts distort the magnetic field generated by the metal detector so that there are regions of reduced magnetic intensity near the side sheets at each end of the feed rolls. If a ferrous metal object of a given size passes through one of these regions there is less likelihood that it will be detected than if its trajectory takes it between the feed rolls nearer the center of the crop feed path.

A primary object of the present invention is to provide a simple, economical solution to this problem, the solution requiring no physical change to the metal detector and only a minimum modification of the harvester side sheets.

SUMMARY OF THE INVENTION

An object of the present invention is to provide an improvement in metal detectors of the type located within a feed roll of a forage harvester and having permanent magnets for generating a magnetic field outside the feed roll for detecting ferrous tramp metal passing in the vicinity of the feed roll, the improvement comprising a plurality of permanent magnets located outside the feed roll and cooperating with magnets in the metal detector to provide a sensing field of generally uniform magnetic intensity across the feed path of the harvester, even in regions bounded by ferrous metal parts.

In accordance with the principles of this invention, a forage harvester having a feed path limited on top and bottom by two feed rolls and bounded at the sides by ferrous side sheets, and a permanent magnet metal detector located inside one of the feed rolls, is provided with additional permanent magnets supported by the side sheets at the sides of the feed path. The additional magnets act with permanent magnets inside the feed roll to provide a magnetic field intensity near the side sheets which increases the likelihood of detection to be substantially the same as near the middle of the feed path. With uniform detection likelihood across the entire width of the feed path, a ferrous object induces substantially the same magnitude signal in the metal detector regardless of whether it passes between the feed rolls near the center of the feed path or at one side thereof.

Other objects of the invention and its mode of operation will become apparent upon consideration of the following description and the accompanying drawings which are not drawn to scale but to better illustrate the principles of the invention.

INVENTION DESCRIPTION OF THE INVENTION

DETAILED DESCRIPTION OF THE

Figure 1:
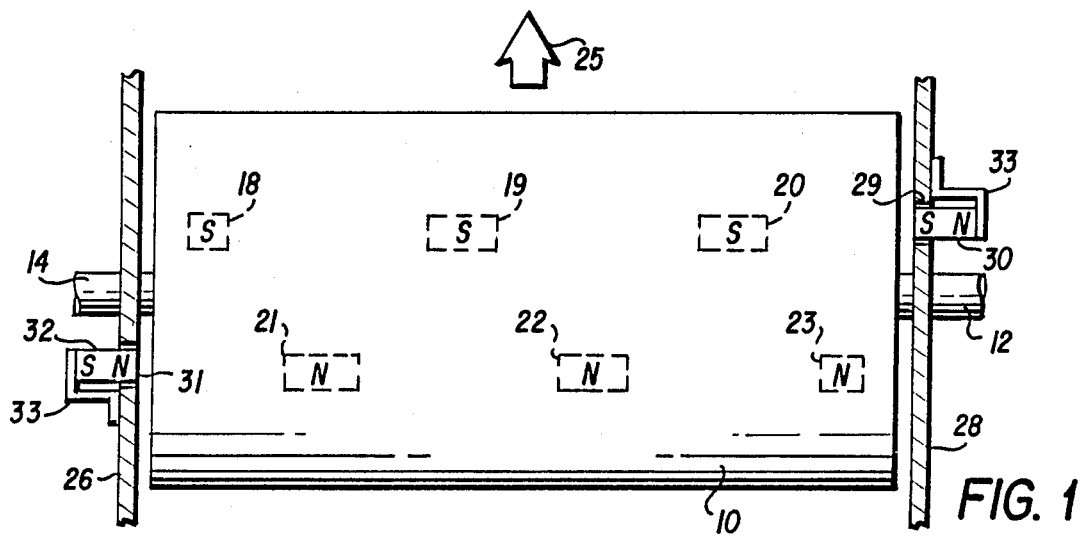
FIG. 1 is a top view of a forage harvester feed roll and shows the location of the permanent magnets of a metal detector inside the feed roll and additional magnets outside the feed roll.

FIG. 1 is a top view of the lower front roll 10 of a forage harvester. The feed roll 10 has a metal detector mounted therein as fully described in Bohman Pat. No. 4,433,528, the disclosure of which is incorporated herein by reference. As disclosed in that patent, the feed roll 10 is supported for rotation on a drive shaft 12 which is affixed to the feed roll, and a fixed hollow shaft 14. The components of the metal detector, including a pair of coils 16 (FIG. 2), a plurality of magnets 18-23, and a ferrous carrier 15 joining the bottoms of the magnets to complete the magnetic circuit, are mounted in a fixed position on the fixed hollow shaft 14. Leads connected to the metal detector are fed through the hollow shaft. The lower front feed roll 10 and an upper front feed roll 24 (FIG. 2) compress crop material and feed the compressed material in the direction of arrow 25 to a cutter head which chops it into smaller pieces. Side sheets 26 and 28 define the lateral limits of the crop feed path. The feed roll 10 is made of a non-magnetic material but the side sheets are ferrous metal. The metal detector generates a magnetic field in the feed path between feed rolls 10 and 24 to detect the presence of tramp metal in the crop material.

As shown in FIG. 1, the metal detector is provided with two rows of permanent magnets, the rows extending transverse to the direction of crop feed and parallel to the axis of rotation of feed roll 10. The first row includes magnets 18-20 and these magnets have their south poles uppermost as the magnets are viewed in FIG. 2. The second row includes magnets 21-23 and these magnets have their north poles extending upwardly.

The magnets 18-23 produce a magnetic field which covers most of the region between the feed rolls 10 and 24. However, there is a region at each end of the feed roll 10 through which little magnetic flux extends, hence there is a reduced likelihood that a piece of tramp metal passing through either of these regions will induce a signal of sufficient magnitude in coils 16 to reliably produce a detection signal.

Figure 3:
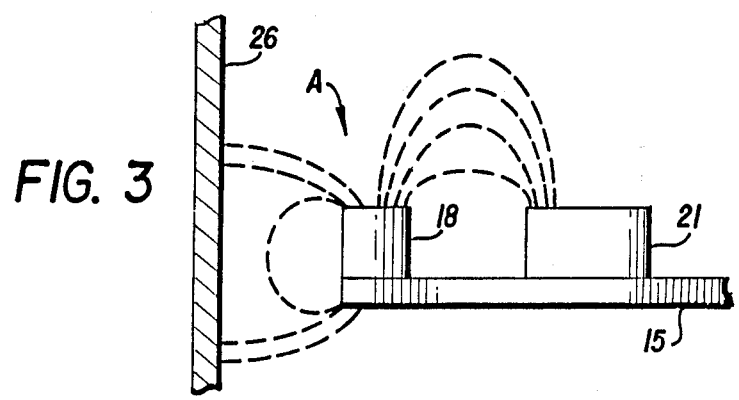
FIGS. 3 and 4 are diagrammatic illustrations of magnetic fields produced by a prior art metal detector without (FIG. 3) and with (FIG. 4) the addition of permanent magnets outside the feed roll.

FIG. 3 illustrates the flux field associated with magnets 18 and 21. The principal flux, depicted by solid lines, extends between the south pole of magnet 18 and the north pole of magnet 21 and provides the sensing field for metal objects passing between the feed rolls over the region where these magnets are located. In addition, a minor flux extends between the south and north poles of magnet 18 and its mounting carrier. This minor flux is influenced by the ferrous side sheet as shown in dashed lines. The density of this minor flux does not extend upwards sufficiently to permit reliable detection of a piece of metal passing through the region A near side sheet 26. A similar region exists at the opposite end of the feed roll where the flux of magnet 23, as influenced by the ferrous sheet 28, is similarly insufficient for reliable detection.

In accordance with the principles of the present invention, a preferred embodiment of the metal detector is provided with at least two additional permanent magnets 30 and 32 located above feed roll 10 and outwardly from the respective ends of the feed roll. Magnet 30 is aligned with the first row of magnets 18-20 and is mounted in an opening 29 provided in side sheet 28. Magnet 32 is aligned with the second row of magnets 21-23 and is mounted in an opening 31 provided in side sheet 26. Magnet 30 is positioned such that its south pole faces the first row of magnets while its north pole is at the end farthermost from the row. Magnet 32 is positioned such that its north pole faces the second row of magnets while its south pole is at the end furthermost from the row.

Figure 2:
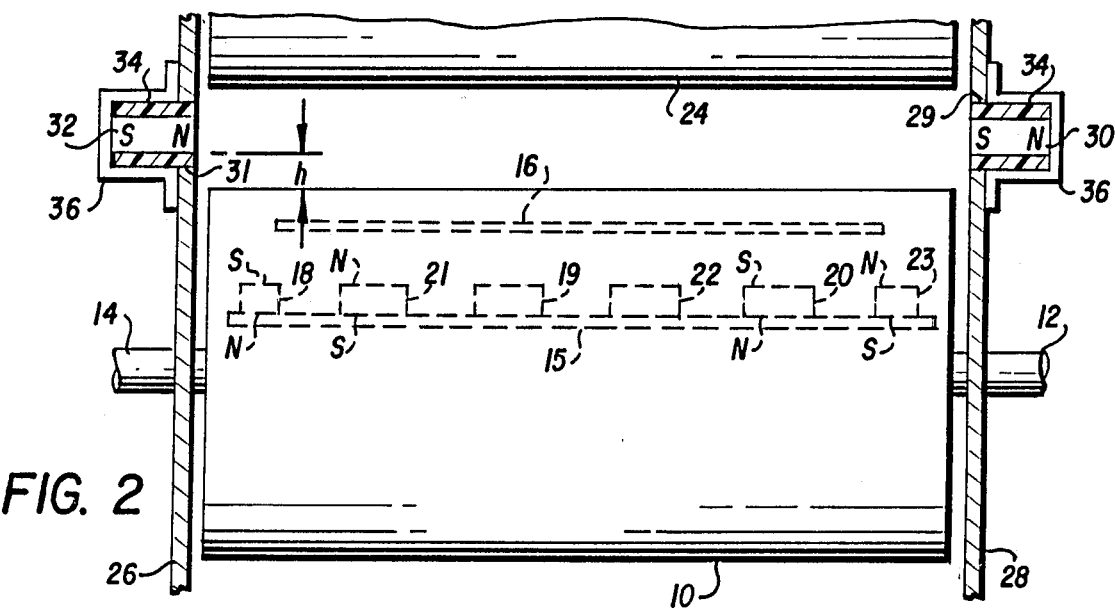
FIG. 2 is a front view of a forage harvester feed path showing one way in which additional magnets may be supported by side sheets.

In FIG. 1, ferrous metal brackets 33 are provided to support magnets 30 and 32 and complete the magnetic circuit. However, the magnets 30 and 32 may be supported in any suitable manner. As illustrated in FIG. 2, the side sheets may be provided with holes 29 and 31 and the magnets 30 and 32 embedded within an epoxy material 34 within ferrous housings 36 and 38 which are in turn attached to the side sheets 26 and 28, respectively, to complete the magnetic circuits. This arrangement permits use of the invention without having to relocate the side sheets 26 and 28. However, it will be understood that the magnets 30 and 32 may be mounted inboard of the side sheets if the side sheets are moved outwardly from the ends of the feed roll. This arrangement, for one end only, is illustrated in FIG. 5 where 26' indicates a former location of the side sheet and 26 indicates its new position. It will be noted that the relative distances between magnets 32 and 18 is the same in FIGS. 4 and 5.

Figure 4:
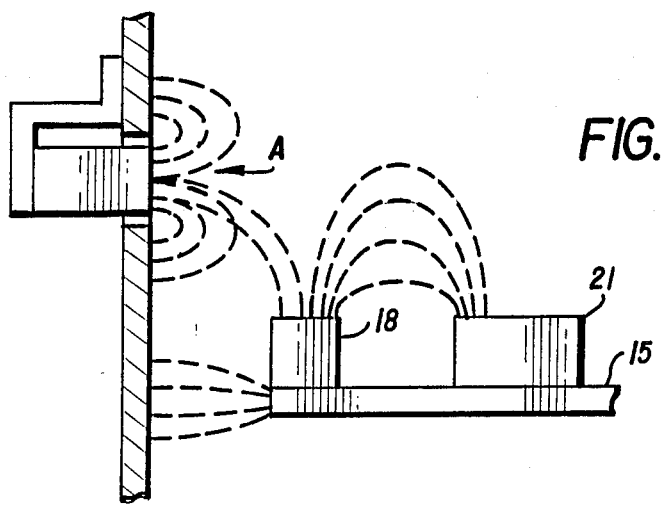
Figure 5:
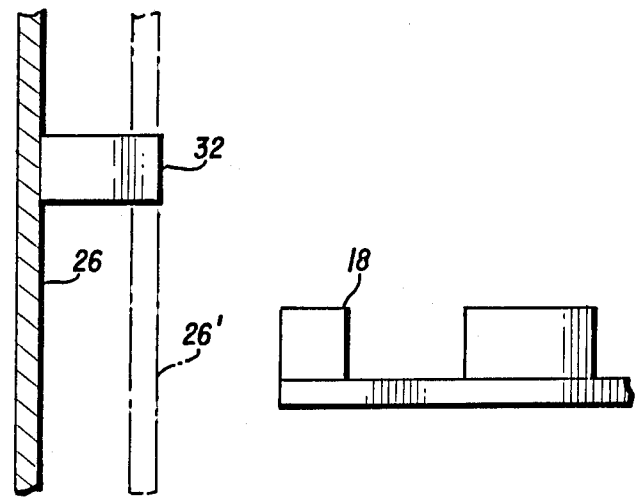
FIG. 5 illustrates an alternative positioning of the additional permanent magnets; and, FIG. 6 is a view similar to FIG. 1 showing an arrangement of four additional permanent magnets.

FIG. 4 illustrates the flux pattern between magnet 18 and additional magnet 32. The flux density in the region A is increased sufficiently such that any tramp metal passing through this region is easily detected. The flux density in the region A depends on the magnets 18 and 32 and their relative positions and hence will vary depending upon which metal detector is used and the height of the magnet 32 above feed roll 10. In a forage harvester such as the New Holland Inc. Model 790, equipped with an electronic metal detector the additional magnets 30 and 32 may be positioned at a height h of about ½ to 1-½ inches above the periphery of feed roll 10 or h+r above the axis of rotation of the feed roll where its radius is r.

Figure 6:
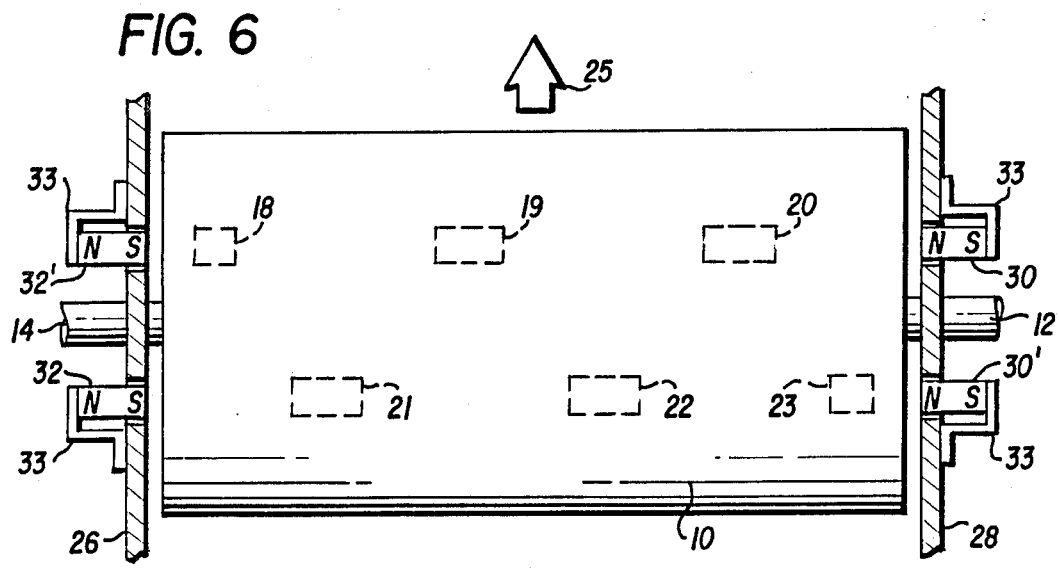

The invention is not limited to the addition of two permanent magnets as shown in FIGS. 1 and 2. FIG. 6 shows an arrangement where two additional permanent magnets 30, 30' and 32, 32' are provided at each end of the feed roll 10, the magnets being poled as shown in the figure and positioned in a plane which includes the magnets in one row of magnets within the metal detector.

From the foregoing description it is seen that the present invention provides an improvement in the detection capabilities of metal detectors used to detect tramp metal in forage harvesters. The improvement can be added to present equipment without physical alteration of the metal detector. The only alteration required in the forage harvester is the provision of holes 29 and 31 in the side sheets if the method of mounting shown in FIG. 2 is employed.

While a preferred embodiment of the invention has been described in specific detail, it will be understood that various modifications and substitutions may be made in the described embodiment without departing from the spirit and scope of the invention as defined by the appended claims.

The embodiments of the invention in which an exclusive property or privilege is claimed are defined as follows.

1. In a forage harvester having first and second feed rolls rotatable about first and second axes for feeding crop material through a crop feed path and a metal detector positioned within said first feed roll for detecting the presence of tramp metal passing between said feed rolls, said metal detector including first and second rows of permanent magnets for producing a magnetic field between said feed rolls to detect said tramp metal, the improvement comprising:

first and second additional permanent magnets; and,
support means for supporting said additional permanent magnets laterally of said crop feed path at a distance from the axis of said first feed roll which is greater than the radius of said first feed roll.

2. The improvement as claimed in claim 1 wherein said support means comprises first and second side sheets defining the lateral limits of said crop feed path.

3. The improvement as claimed in claim 1 wherein said support means comprises first and second ferrous side sheets defining the lateral limits of said crop feed path.

4. The improvement as claimed in claim 3 wherein a hole is provided in each of said side sheets and a ferrous cover is attached to each side sheet on the side thereof opposite said crop feed path, each of said covers having potting material therein for supporting one of said additional permanent magnets.

5. The improvement as claimed in claim 1 wherein the magnets of said first row have south poles at their ends nearest said second feed roll and the magnets of said second row have north poles at their ends nearest said second feed roll, said first additional permanent magnet having a south pole at its end nearest said first row and said second additional permanent magnet having a north pole at its end nearest said second row.

6. The improvement as claimed in claim 5 wherein said first additional permanent magnet coacts with one magnet in said second row to produce a magnetic field in a region near one lateral extent of said crop feed path, and said second additional permanent magnet coacts with one magnet in said first row, to produce a magnetic field in a region near the other lateral extent of said crop feed path.

7. The improvement as claimed in claim 1 and further comprising third and fourth additional permanent magnets, said support means supporting said third and fourth permanent magnets laterally of said crop feed path at a distance from the axis of said first feed roll which is greater than the radius of said first feed roll.

8. The improvement as claimed in claim 7 wherein the magnets of said first row have south poles at their ends nearest said second feed roll and the magnets of said second row have north poles at their ends nearest said second feed roll, said first and third additional permanent magnets having a south pole at their ends nearest said first row and said second and fourth additional permanent magnets having a north pole at their ends nearest said second row.

* * * * *